United States Patent [19]

Munson

[11] Patent Number: 5,006,356
[45] Date of Patent: Apr. 9, 1991

[54] TREATMENT OF FRUIT-BASED OR VEGETABLE-BASED BEVERAGES WITH PRECIPITATED MAGNESIUM SILICATE

[75] Inventor: James R. Munson, Somerville, N.J.

[73] Assignee: The Dallas Group of America, Inc., Liberty Corner, N.J.

[21] Appl. No.: 523,707

[22] Filed: Apr. 19, 1990

[51] Int. Cl.⁵ .............................................. C12H 1/02
[52] U.S. Cl. ................... 426/330.4; 426/330.5; 426/423
[58] Field of Search ................. 426/330.4, 330.5, 592, 426/599, 423

[56] References Cited

U.S. PATENT DOCUMENTS

| | | | |
|---|---|---|---|
| 3,940,498 | 2/1976 | Butterworth | 426/422 |
| 3,958,023 | 5/1976 | Butterworth | 426/330.5 |
| 4,508,742 | 4/1985 | McLaughlin | 426/423 |
| 4,631,193 | 12/1986 | Sobus | 426/423 |
| 4,636,394 | 1/1987 | Hsu | 426/423 |
| 4,764,384 | 8/1988 | Gyann | 426/423 |
| 4,766,000 | 8/1988 | Sobus | 426/423 |
| 4,797,294 | 1/1989 | Berg | 426/423 |
| 4,880,652 | 11/1989 | Regutti | 210/282 |

Primary Examiner—Carolyn Paden
Attorney, Agent, or Firm—Elliot M. Olstein; Raymond J. Lillie

[57] ABSTRACT

A method of treating a fruit-based or vegetable-based beverage to remove chill haze components therefrom which comprises contacting the beverage with an effective amount of an amorphous hydrous precipitated synthetic magnesium silicate which has been treated to reduce the pH thereof to less than about 9.0. Such a method is particularly applicable to the treatment of beer and related beverages and provides for improved removal of chill haze components from such beverages.

9 Claims, No Drawings

TREATMENT OF FRUIT-BASED OR VEGETABLE-BASED BEVERAGES WITH PRECIPITATED MAGNESIUM SILICATE

BACKGROUND OF THE INVENTION

This invention relates to the treatment of fruit-based beverages (e.g., fruit juice, cider, wine, etc.) or vegetable-based beverages (e.g., beer, ale, porter, stout, malt liquor, etc.) to remove chill haze components therefrom. More particularly, this invention relates to the treatment of such beverages with an amorphous precipitated synthetic magnesium silicate which has been treated to reduce the pH thereof to less than about 9.0, to remove chill haze components therefrom.

Many fruit- and vegetable-based beverages, such as those hereinabove described, tend to develop a haze, known as "chill haze" upon an elapse of time and/or changes in temperature. Such chill haze may be caused by the coagulation of various organic materials in the beverage. The chill haze components may include substantial amounts of proteins, polyphenols, and other materials.

A number of methods have been developed to remove at least some of the chill haze forming agents in fruit- or vegetable-based beverages, and in particular beer.

U.S. Pat. No. 3,251,693, issued to Brenner, discloses the treatment of beer to improve the clarity thereof (i.e., by removing chill haze forming components) by contacting the beer with a composition which includes at least 70 percent by weight of calcium silicate, magnesium silicate, or zinc silicate. The silicate preferably is produced by hydrothermal reaction of diatomaceous silica with lime or magnesia.

U.S. Pat. No. 3,940,498, issued to Butterworth, et al, discloses the treatment of vinegar and beverages such as beer, ale, wine, cider, and fruit juices, and in particular beer, with a synthetic magnesium silicate. The magnesium silicate is prepared through the hydrothermal reaction of a silica, such as diatomite, with magnesia. The resulting magnesium silicate is treated with a light acid wash, followed by a water wash. The acid treatment reduces the magnesium content, on an oxide basis of the magnesium silicate to less than about 14%.

U.S. Pat. No. 4,508,742, issued to McLaughlin, et al, discloses the treatment of beer to remove chill haze and metal contaminants therefrom by contacting the beer with a combination of an inorganic chill-proofing agent, such as silica gel, and from 0.2 to 6 parts by weight of a porous, amorphous magnesium silicate for each 100 parts by weight of chill-proofing agent. The magnesium silicate may be formed through ion exchange of magnesium for metals of other insoluble silicates, or through precipitation formed upon the contact of a magnesium salt and a source of silicate ions in aqueous medium. Such a combination of silica gel and magnesium silicate is effective in removing metal contaminants in addition to being employed as a chill-proofing agent.

U.S. Pat. No. 4,797,294, issued to Berg, discloses the treatment of beer, ale, porter, or stout with a composition of 30% to 60% magnesium silicate and 40% to 70% silica gel. The magnesium silicate is an amorphous and porous magnesium silicate which may be formed by precipitation upon the contact of a magnesium salt and a source of silicate ions in an aqueous medium. This combination was found to be a more effective chill-proofing agent than that disclosed in the '742 patent hereinabove described.

SUMMARY OF THE INVENTION

In accordance with an aspect of the present invention, there is provided a method of treating a fruit-based or vegetable-based beverage to remove chill haze components therefrom. The method comprises contacting the beverage with an effective amount of an amorphous hydrous, precipitated synthetic magnesium silicate which has been treated to reduce the pH thereof to less than about 9.0. Contact of the magnesium silicate is maintained with the beverage for a time sufficient to remove the chill haze components from the beverage, and the magnesium silicate is then separated from the beverage.

As used herein, the term "precipitated" means that the amorphous hydrous precipitated synthetic magnesium silicate is produced as a result of precipitation formed upon the contact of a magnesium salt and a source of silicate in an aqueous medium.

The amorphous hydrous precipitated synthetic magnesium silicate is then treated to reduce the pH thereof to less than about 9.0. For purposes of the present application, the pH of the magnesium silicate is the pH of the magnesium silicate as measured in a 5% slurry of the magnesium silicate in water. The pH of the treated magnesium silicate in a 5% slurry preferably is from about 8.2 to about 8.9, and more preferably from about 8.5 to about 8.8. An example of such a treated amorphous hydrous precipitated synthetic magnesium silicate is available as Magnesol ® XL, a product of the Dallas Group of America, Inc., Liberty Corner, N.J.

DESCRIPTION OF THE EMBODIMENTS

The magnesium silicate hereinabove described may be used to treat a variety of fruit-based and vegetable-based beverages to remove chill haze components therefrom. Such beverages may be fermented, or non-fermented. Examples of fruit-based beverages include wine, apple juice, grape juice, pineapple juice, apple cider, etc. Examples of vegetable-based beverages include beer, ale, porter, stout, malt liquor, etc.

The method of the present invention is particularly applicable to the treatment of beer, ale, porter, stout, malt liquor, and other related beverages. Applicant has found unexpectedly that when beer is contacted with a treated amorphous hydrous precipitated synthetic magnesium silicate, said magnesium silicate having been treated to reduce the pH thereof to less than about 9.0, one obtains an improvement in the removal of chill haze components as opposed to the treatment of beer with other agents such as silica gel, or magnesium silicates that were not treated to reduce the pH thereof to less than about 9.0, or acid-treated magnesium silicates that are not precipitated magnesium silicates.

The amorphous hydrous precipitated synthetic magnesium silicate, treated as hereinabove described, when employed to treat a fruit-based or vegetable-based beverage to remove chill haze components therefrom, may be used alone or in combination with other components. Such other components which may be employed in combination with the treated amorphous hydrous precipitated synthetic magnesium silicate include, but are not limited to, natural or activated clays, silica gel, diatomaceous earth, polyvinyl pyrrolidone, enzymes, tannic acid, calcium silicate, aluminum oxide, synthetic aluminum silicate, activated carbon, natural or synthetic zeolites, or other adsorbents and/or filter aids.

The magnesium silicate is added to the beverage in an amount effective to remove chill haze components therefrom. The magnesium silicate preferably is added to the beverage in an amount of at least about 50 ppm based on the weight of the beverage, and no greater than about 5,000 ppm. More preferably, the magnesium silicate is added to the beverage in an amount of from about 50 ppm to about 2,000 ppm, and most preferably from about 50 ppm to about 800 ppm. In a particularly preferred embodiment, the magnesium silicate is added in an amount of about 430 ppm.

The magnesium silicate is separated from the beverage, subsequent to treatment of the beverage, by any conventional separation method known to those skilled in the art. One acceptable method of separating the magnesium silicate from the beverage is through filtering the beverage to separate the magnesium silicate therefrom. Such filtering methods are known to those skilled in the art.

In a preferred embodiment, the beverage, prior to the contacting thereof with the acid-treated amorphous hydrous precipitated synthetic magnesium silicate, may be filtered through a conventional filter with or without a filter aid in a primary filtration step. Such a primary filtration step removes turbidity causing components which may be of biological and/or physicochemical origins. Such turbidity may be caused by suspended solids substantially above the colloidal range. Treatment with a filter aid, or fining agent, serves to coagulate such coarse particles to enable their removal from the beverage. In one embodiment, the filter aid may be diatomaceous earth.

The invention will now be described with respect to the following examples; however, the scope of the present invention is not intended to be limited thereby.

EXAMPLE

An amorphous hydrous precipitated synthetic magnesium silicate, treated to reduce the pH thereof to less than about 9.0, was tested for removal of chill haze components as compared with other treating agents. In the Tests I through III which follow, Agent 1 is 100% silica gel, sold by PQ Corporation of Valley Forge, Pa., as Britesorb A-100. Agent 2 is 100% of a treated amorphous hydrous precipitated synthetic magnesium silicate in accordance with the present invention and sold by the Dallas Group of America as Magnesol® XL. Agent 3 is 100% of a amorphous hydrous precipitated synthetic magnesium silicate (no treatment to reduce the pH thereof to less than about 9.0). Agent 4 is a composition of 50% silica gel (Britesorb A-100) and 50% of an amorphous hydrous precipitated synthetic magnesium silicate (no treatment to reduce the pH thereof to less than about 9.0). Agent 5 is an acid-treated magnesium silicate wherein the magnesium silicate, prior to the acid treatment, was produced by the hydrothermal reaction of a silica, such as diatomite, with magnesia. The acid treatment was carried out in accordance with the acid treatment disclosed in U.S. Pat. No. 3,940,498. The particular magnesium silicate employed as Agent 5 is sold as T-21 by Johns-Manville Corp.

Chill haze is determined by the difference in Formazine Turbidity Units (FTU) at 20° C. and 0° C. after incubation, chillproofing treatment, and final filtration of beer. In test I, Agent 2 was compared with Agents 1 and 3. In test II, Agent 2 was compared with Agents 1 and 4. In test III, Agent 2 was compared with Agents 1 and 5.

Each of tests I, II, and III was conducted as follows:
1. Ruh beer is run through a primary filtration with a diatomaceous earth filter aid at less than 10° C.
2. The primary filtered beer is treated from 40 to 60 minutes with one of chill-proofing Agents 1, 2, 3, 4, or 5. Treatment consists of agitating the beer at less than 10° C.
3. The treated beer is run through a final filtration at 10° C., bottled and capped.
4. The filtered beer is immediately warmed to 20° C. Chill haze formation is measured by Formazine Turbidity Units (FTU) at 20° C.
5. The beer is pasteurized at 60° C. for eight minutes in the bottle.
6. Immediately after pasteurization, the beer is put into water until the temperature reaches 40° C. The beer is then placed in chopped ice until the temperature drops to 20° C. FTU is measured again at 20° C.
7. The beer is placed in ice again and held for 24 hours at 0° C. FTU is measured again at 0° C.
8. The beer is warmed to 20° C. FTU is measured at 20° C.
9. The beer is incubated for 48 hours at 50° C.
10. The beer is then placed in chopped ice for 24 hours, and FTU is measured at 0° C.
11. The beer is warmed to 20° C., and FTU is measured at 20° C. Chill haze is the difference in formazine turbidity units at 20° C. and 0° C. The chill haze for each agent in each test is indicated under the column headed "Cycle 1" in Table I below. Steps 10 and 11 are then repeated for the chill haze measurement for Cycle 2. Cycle 1 is the equivalent of 60 days' shelf life, whereas Cycle 2 is the equivalent of 120 days' shelf life. The results of each of Tests I, II, and III are given in Table I below.

TABLE I

| Agent | Dosage | Chill Haze | |
|---|---|---|---|
| | | Cycle 1 | Cycle 2 |
| Test I | | | |
| 1 | 430 ppm | 210 | 250 |
| 2 | 430 ppm | 176 | 190 |
| 3 | 430 ppm | 485 | 500 |
| Test II | | | |
| 1 | 430 ppm | 120 | 210 |
| 2 | 430 ppm | 76 | 220 |
| 4 | 430 ppm | 110 | 245 |
| Test III | | | |
| 1 | 430 ppm | 97 | 216 |
| 2 | 430 ppm | 52 | 98 |
| 5 | 430 ppm | 115 | 280 |

The above results indicate that the treatment of beer with an amorphous hydrous precipitated synthetic magnesium silicate, treated to reduce the pH thereof to less than about 9.0, provides for improved removal of chill haze components as compared with other treating agents such as silica gel, synthetic magnesium silicate which is not treated to reduce the pH thereof to less than about 9.0, mixtures of such non-treated magnesium silicate and silica gel, and acid-treated magnesium silicate formed by a hydrothermal reaction of diatomite with magnesia.

It is to be understood, however, that the scope of the present invention is not to be limited to the specific embodiments described above. The invention may be practiced other than as particular by described and still be within the scope of the accompanying claims.

What is claimed is:

1. A method of treating a fruit-based or vegetable-based beverage to remove chill haze components therefrom, comprising:

contacting said beverage with an effective amount of an amorphous hydrous precipitated synthetic magnesium silicate, said magnesium silicate having been treated to reduce the pH thereof to less than about 9.0;

maintaining contact of said magnesium silicate with said beverage for a time sufficient to remove said chill haze components from said beverage; and separating said magnesium silicate from said beverage.

2. The method of claim 1 wherein said magnesium silicate has a pH in a 5% slurry of from about 8.2 to about 8.9.

3. The method of claim 2 wherein said magnesium silicate has a pH in a 5% slurry of from about 8.5 to about 8.8.

4. The method of claim 1 wherein said beverage is beer.

5. The method of claim 1 wherein said beverage is contacted with said magnesium silicate in an amount of at least about 50 ppm, based on the weight of said beverage.

6. The method of claim 5 wherein said beverage is contacted with said magnesium silicate in an amount of no greater than about 5,000 ppm, based on the weight of said beverage.

7. The method of claim 5 wherein said beverage is contacted with said magnesium silicate in an amount of from about 50 ppm to about 2,000 ppm.

8. The method of claim 7 wherein said beverage is contacted with said magnesium silicate in an amount of from about 50 ppm to about 800 ppm.

9. The method of claim 8 wherein said beverage is contacted with said magnesium silicate in an amount of about 430 ppm.

* * * * *